US012622834B2

(12) United States Patent
Mohoff

(10) Patent No.: US 12,622,834 B2
(45) Date of Patent: May 12, 2026

(54) PELVIC CRADLE

(71) Applicant: CRANIAL SACRAL THERAPY, LLC, Hamilton, MT (US)

(72) Inventor: Jody Marie Mohoff, Corvallis, MT (US)

(73) Assignee: Cranial Sacral Therapy, LLC, Hamilton, MT (US)

( * ) Notice: Subject to any disclaimer, the term of this patent is extended or adjusted under 35 U.S.C. 154(b) by 211 days.

(21) Appl. No.: 18/451,683

(22) Filed: Aug. 17, 2023

(65) Prior Publication Data

US 2025/0057720 A1 Feb. 20, 2025

(51) Int. Cl.
*A61H 1/02* (2006.01)
*A47C 20/02* (2006.01)

(52) U.S. Cl.
CPC .......... *A61H 1/0244* (2013.01); *A47C 20/02* (2013.01); *A61H 2201/1253* (2013.01); *A61H 2201/1628* (2013.01); *A61H 2201/1635* (2013.01); *A61H 2203/0456* (2013.01)

(58) Field of Classification Search
CPC .......... A61H 1/0244; A61H 2201/1253; A61H 2201/1628; A61H 2201/1635; A61H 2203/0456; A47C 20/02; A63B 21/00047; A63B 21/4039; A63B 26/00
USPC .......................................... 601/34; 5/653, 648
See application file for complete search history.

(56) References Cited

U.S. PATENT DOCUMENTS

| | | | | |
|---|---|---|---|---|
| 2013/0160211 | A1* | 6/2013 | Klein | A61G 13/123 5/648 |
| 2017/0291055 | A1* | 10/2017 | Madion | A63B 23/0211 |
| 2019/0133857 | A1* | 5/2019 | Kuiper | A61G 7/05776 |
| 2021/0282559 | A1* | 9/2021 | Towle | A47C 17/04 |

OTHER PUBLICATIONS https://www.amazon.com/StrongTek-Supportive-Exercise-Accessories-Strength/dp/B07C3GMFN5?th=1 (Year: 2021).*
STRONG-TEK.COM. Yoga Blocks. https://www.strong-tek.com/products/yoga-foam-wedge-blocks?variant=17608399126592 (downloaded Aug. 10, 2023).
MASSAGETOOLS.COM. Sacral Blocks. https://massagetools.com/earthlite-sacral-blocks.html (downloaded Aug. 10, 2023).
MEDICALESHOP.COM. Core-pelvic sacral block. https://www.medicaleshop.com/core-pelvic-sacral-block (downloaded Aug. 10, 2023).

* cited by examiner

*Primary Examiner* — Justin C Mikowski
*Assistant Examiner* — Deborah Talitha Gedeon
(74) *Attorney, Agent, or Firm* — LOZA & LOZA, LLP; Kevin L. Soules

(57) ABSTRACT

A therapeutic pelvic cradle device includes a base plate, a first support block with a thick end and a thin end mounted to the base plate and a second support block with a thick end and a thin end mounted to the base plate, wherein the first support block and the second support block are arranged such that the thin end of the first support block and the thin end of the second support block are configured at an acute angle between one another on the base plate.

12 Claims, 9 Drawing Sheets

PELVIC CRADLE

TECHNICAL FIELD

Embodiments are generally related to the field of therapeutic devices. Embodiments are related to the field of chiropractic and medical devices. Embodiments are further related to the field of orthopedic devices. Embodiments are further related to traction devices. Embodiments are also directed to methods for anatomy alignment. Embodiments are also related to methods, systems, and devices for aiding in sacral release.

BACKGROUND

Among the most common issues reported by medical patients is chronic pain. There are untold numbers of therapeutics, medical procedures, and medications all of which have been used to varying degrees of efficacy to treat pain. Despite the ongoing efforts to find ways to address chronic pain, back pain, fibromyalgia, headaches, fascial adhesions, and other such conditions, there remains a significant gap in effective treatment solutions.

One promising option is craniosacral therapy (CST), which is generally understood to be a gentle, non-invasive treatment option, for numerous pain related conditions, including but not limited to, chronic pain, fibromyalgia headaches, neck pain, fascial adhesions, scoliosis, lordosis, kyphosis, sciatica, hip pain, tail bone pain, bulged disks, pinched nerves, and other such ailments.

CST practitioners use gentle touch to relieve tension in the central nervous system. Patients report various positive outcomes post treatment, including reduction in pain, improved health and immunity, as well as a more general feeling of wellness. CST treatment is complex, but can be generally understood as the placement of hands and gentle pressure on a patient to release connective tissue, or "fascia."

CST is believed to improve biological processes by promoting inherent self-regulation. The therapy has been used successfully in patients of all ages both male and female.

The promise of CST treatment has been followed by a number of CST related treatment devices. Such devices may include, but are not limited to, foam rollers, massage balls, and massage wheels. All of these devices can be helpful but also have some drawbacks. For example, use of foam rollers or massage balls can be painful. In addition, in some cases, the patient may not be in good enough physical condition to use these tools because the patient may not be able to get to and from the floor and/or actively move their body effectively with the tool.

Other chiropractic devices may also be helpful in addressing certain chronic conditions. For example, devices like inversion tables may help relive back pain. However, inversion tables can create undue stress at the knee and hip joints without really targeting the spinal traction. Head pressure from hanging upside down is another drawback of inversion tables.

Accordingly, there is a need in the art for methods and systems that address the aforementioned gaps in current technology as disclosed in the embodiments detailed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is an aspect of the disclosed embodiments to provide a chiropractic device.

It is another aspect of the disclosed embodiments to provide a therapeutic body positioning device.

It is another aspect of the disclosed embodiments to provide a medical and/or chiropractic block for treating pain.

It is another aspect of the disclosed embodiments to provide an orthopedic body positioning device.

It is another aspect of the disclosed embodiments to provide a pelvic cradle system.

The aforementioned aspects and other objectives and advantages can now be achieved as described herein. In an exemplary embodiment, a pelvic cradle system comprises a base plate, a first wedge shaped support block mounted to the base plate, and a second wedge shaped support block mounted to the base plate. In an embodiment, the first wedge shaped support block and the second wedge shaped support block are arranged at a nominal angle of 60 degrees between one another. In an embodiment, the first wedge shaped support block further comprises a tapered top surface intersecting with a flat landing surface. In an embodiment the pelvic cradle system comprises a joint between the tapered top surface and a bottom surface forming the joint. In an embodiment, the joint comprises a nominally 23 degree angle between the tapered top surface and the bottom surface. In an embodiment, the second wedge shaped support block further comprises a tapered top surface intersecting with a flat landing surface. In an embodiment, the second wedge shaped support block further comprises a joint between the tapered top surface and a bottom surface forming the joint. In an embodiment, the joint comprises a nominally 23 degree angle between the tapered top surface and the bottom surface. In an embodiment, the system further comprises a first connection pattern formed on the base plate with a textured surface and a second connection pattern formed on the base plate with a textured surface. In an embodiment, the system further comprises an adhesive connecting the first wedge shaped support block to the base plate and an adhesive connecting the second wedge shaped support block to the base plate. In an embodiment, the base plate further comprises a perimeter further comprising a bottom arc, a straight left side adjoining the bottom arc, a straight right side adjoining the bottom arc, a left angled section adjoining the straight left side, a right angled section adjoining the straight right side, and a flat top section adjoining the left angled section and the right angled section. In an embodiment, the system includes a handle formed in the base plate.

In another embodiment, a therapeutic device comprises a base plate, a first support block with a thick end and a thin end mounted to the base plate, and a second support block with a thick end and a thin end mounted to the base plate, wherein the first support block and the second support block are arranged such that the thin end of the first support block and the thin end of the second support block are configured at an acute angle between one another on the base plate. In an embodiment, the support block and the second support block are configured to cradle a pelvis of a patient. In an embodiment, the first support block further comprises a tapered top surface intersecting with a flat landing surface and a joint between the tapered top surface and a bottom surface forming the joint. In an embodiment, the second support block further comprises a tapered top surface intersecting with a flat landing surface and a joint between the tapered top surface and a bottom surface forming the joint. In an embodiment the device further comprises a first connection pattern formed on the base plate with a textured surface wherein the first support block is mounted to the base plate at the first connection pattern and a second connection pattern formed on the base plate with a textured surface wherein the second support block is mounted to the base plate at the second connection pattern. In an embodiment, the device further comprises an adhesive connecting the first support block to the base plate and an adhesive connecting the second support block to the base plate.

In another embodiment a pelvic cradle system comprises a base plate, a first wedge shaped support block with a thick end and a thin end mounted to the base plate, and a second wedge shaped support block with a thick end and a thin end mounted to the base plate, wherein the first wedge shaped support block and the second wedge shaped support block are arranged such that the thin end of the first support block and the thin end of the second support block are configured at an acute angle between one another on the base plate. In an embodiment, the acute angle between the first wedge shaped support block and the second wedge shaped support is 60 degrees.

BRIEF DESCRIPTION OF THE FIGURES

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
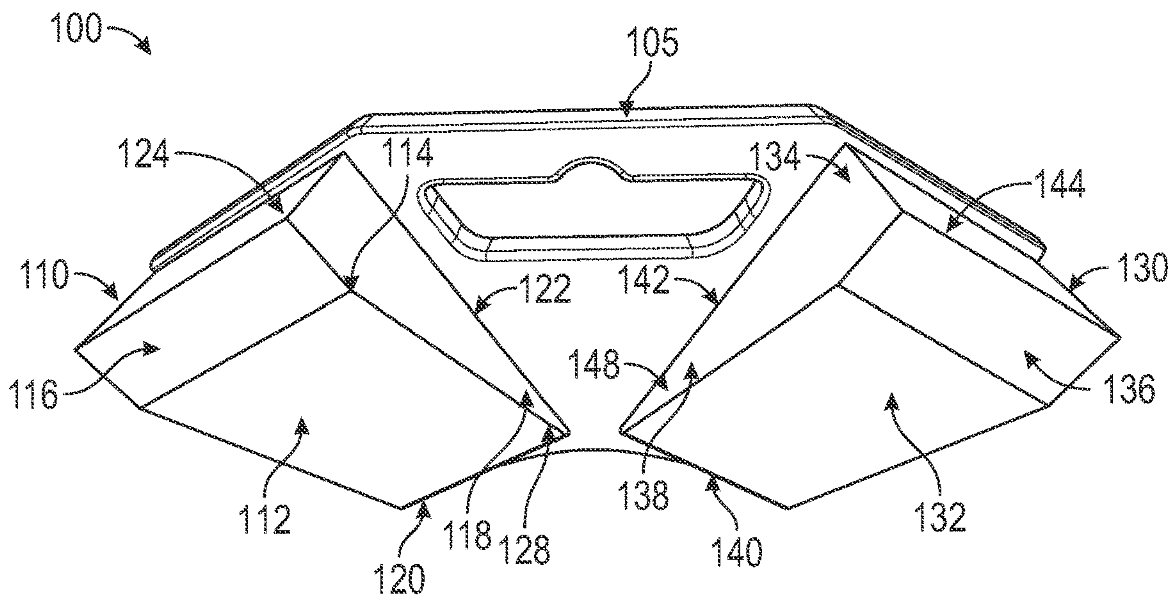
FIG. 1 illustrates a pelvic cradle system, in accordance with aspects of the embodiments.

The particular values and configurations discussed in the following non-limiting examples can be varied, and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase “in one embodiment” as used herein does not necessarily refer to the same embodiment and the phrase “in another embodiment” as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

Various aspects of the disclosed systems and methods are provided herein. The disclosed embodiments are directed to an easy to use passive device principally comprising a base plate and two support blocks. The device can be placed under a patient's pelvis with their knees bent allowing gravity and body weight to rest on the blocks. As the body rests, cradled by the blocks, the sacro-iliac joints have the opportunity to open, allowing the sacrum to release towards the surface beneath the device, on which the patient is laying.

The device can be used to apply a gentle traction on the lower spine while helping to retrain the lumbar spine from lumbar lordosis (also known as "swayback"), to facilitate proper spinal posture.

FIG. 1 illustrates a perspective view pelvic cradle system 100 in accordance with the disclosed embodiments. The pelvic cradle system 100 comprises a base plate 105, a first support block 110, and a second support block 130. The first support block 110 and second support block 130 are configured to operably attach to the base plate.

The first support block 110 comprises a wedge shape with a tapered top surface 112. The thick end 114 of the first support block 110, can include a flat landing surface 116 that meets the tapered top surface 112. The back wall 124 forms a nominally 90 degree angle with the flat landing surface 116. The first support block 110 can then terminate at the thin end 118 as a joint 120 between the top surface 112 and the bottom surface 122 of the first support block 110. The joint forms an acute angle 128 between the top surface 112 and the bottom surface 122. In certain embodiments the angle 128 can be nominally 23 degrees, although other angles are possible.

Similarly, the second support block 130 comprises a wedge shape with a tapered top surface 132. The thick end 134 of the second support block 130, can include a flat landing surface 136 that meets the tapered top surface 132. The back wall 144 forms a nominally 90 degree angle with the flat landing surface 136. The second support block 130 can then terminate at the thin end 138 as a joint 140 between the top surface 132 and the bottom surface 142 of the second support block 130. The joint 140 forms an acute angle between the top surface 132 and the bottom surface 142. In certain embodiments the angle 148 can be nominally 23 degrees, although other angles are possible.

Figure 2:
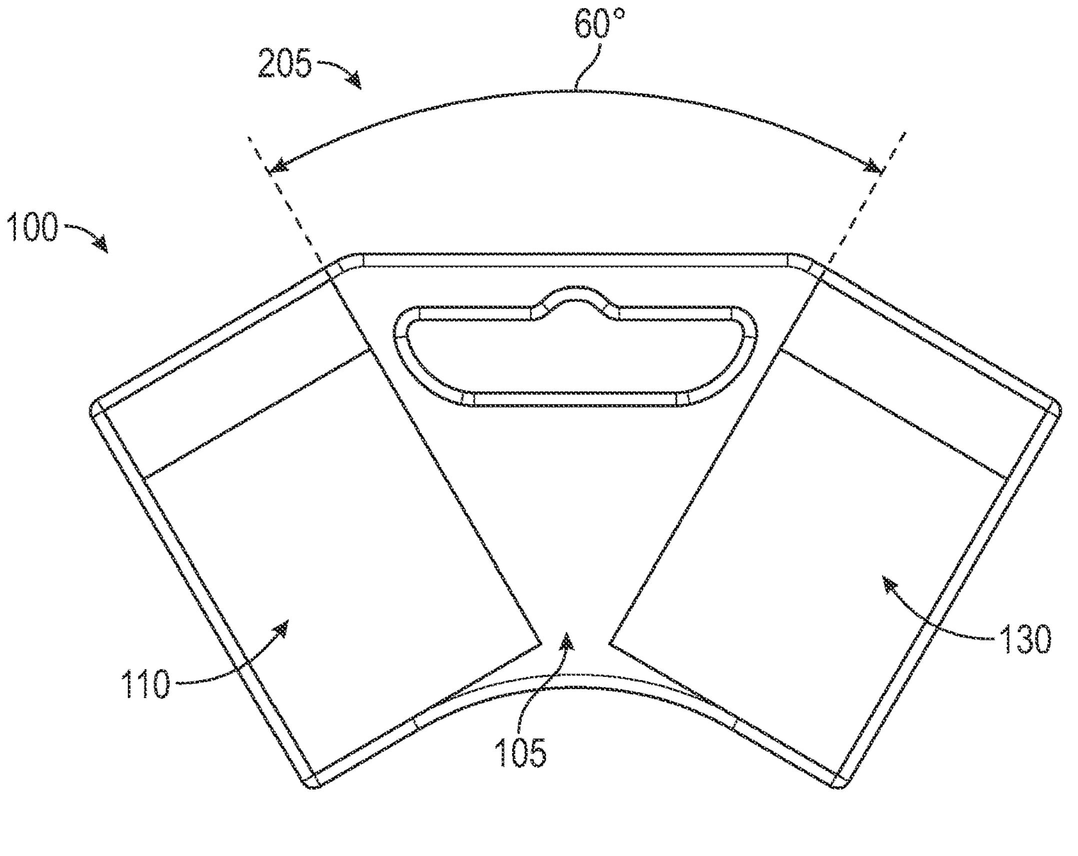
FIG. 2 illustrates a top plan view of a pelvic cradle system, in accordance with aspects of the embodiments.

FIG. 2 illustrates a top plan view of the pelvic cradle system 100 in accordance with the disclosed embodiments. Each of the first support block 110 and the second support block 130 are angled such that the angle 205 between the first support block and the second support block is an acute angle 205. In certain embodiments, the acute angle 205 can be nominally 60 degrees although other angles may also be used.

The angle 205 is selected to hold the pelvis in a tucked position with space for the sacrum to "float" freely. This configuration can be used to correct spinal alignment issues including but not limited to scoliosis, lordosis, and kyphosis. In addition, when the sacrum is free, symptoms such as sciatica, hip pain, and tail bone pain can be resolved.

Figure 3:
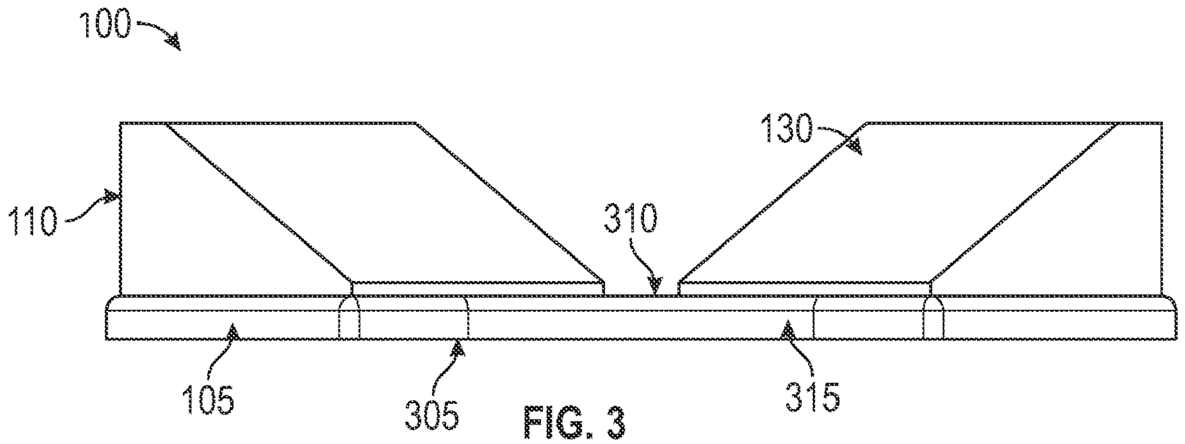
FIG. 3 illustrates an elevation view of a pelvic cradle system, in accordance with aspects of the embodiments.

FIG. 3 illustrates a front elevation view of the pelvic cradle system 100 in accordance with the disclosed embodiments. In this view, the bottom surface 305 and top surface 310 of the base plate 105 are illustrated. The body of the base plate can be formed of a single piece, and can comprise wood, plastic, hard rubber, metal, or the like.

Figure 4:
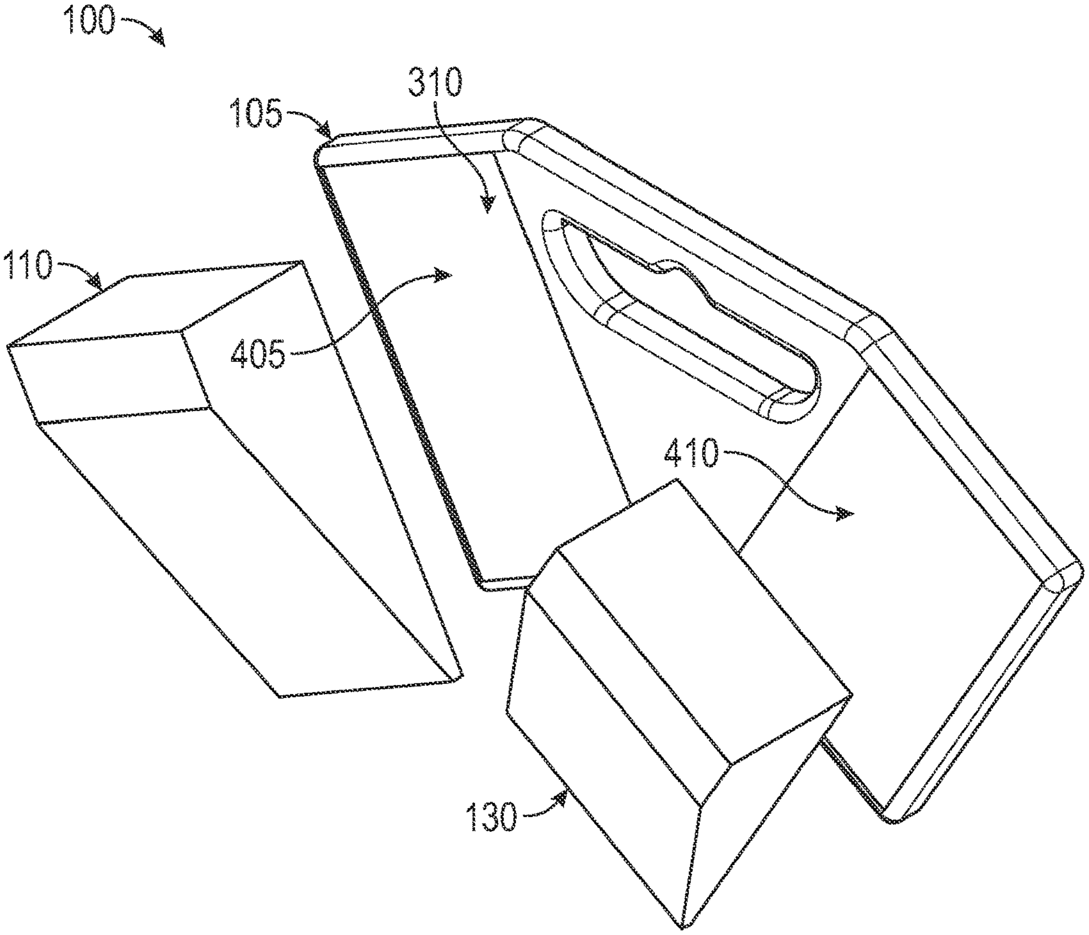
FIG. 4 illustrates a disassembled view of pelvic cradle system, in accordance with aspects of the embodiments.

FIG. 4 illustrates a separated view of the pelvic cradle system 100, comprising the base plate 105, first support block 110, and second support block 130. In this view the top surface 310 of the base plate 105 is illustrated. The top surface 310 can include a first textured surface 405 directly in line with and beneath the first support block 110. The first support block 110 can be bound to the base plate 105 with an adhesive (not shown). Likewise, the top surface 310 can include a second textured surface 410 directly in line with and beneath the second support block 130. The second support block 130 can be bound to the base plate 105 with an adhesive (not shown).

Figure 5:
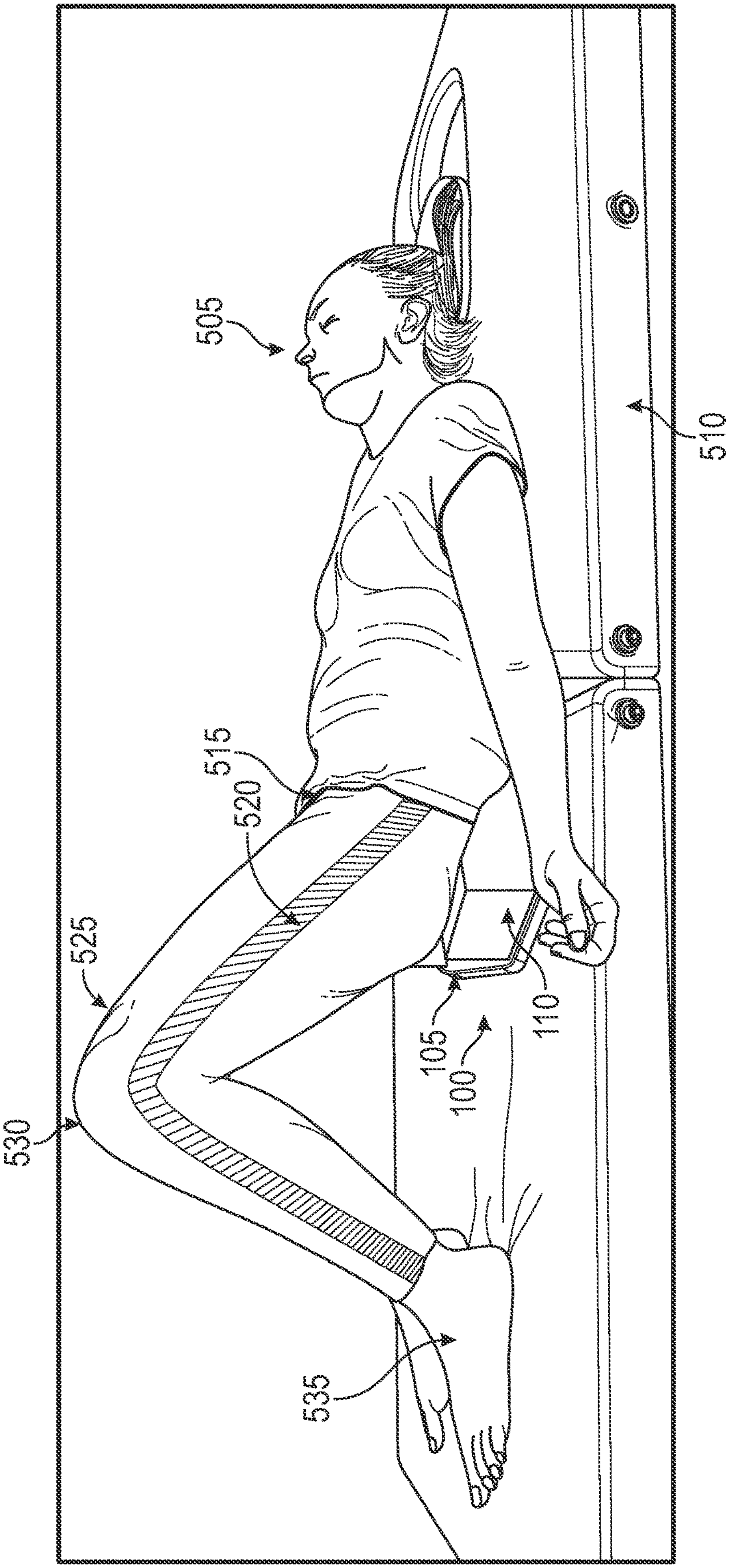
FIG. 5 illustrates the use of a pelvic cradle system, in accordance with aspects of the embodiments.

FIG. 5 illustrates operational use of the pelvic cradle system 100, with a patient 505. As illustrated, the pelvic cradle system 100, can be disposed on a generally flat underlying surface 510. In certain embodiments, the underlying surface 510 can be an exam table, treatment table, therapy table, or the floor.

Note, the underlying surface 510 may be padded, as is the case with the exam table illustrated in FIG. 5. The base plate 105 is configured of rigid material and is configured with a generally flat lower surface 305, so that the pelvic cradle system can be used on tables which may include padding.

The patient 505 is positioned on the underlying surface 510, with their pelvis 515 generally positioned over the pelvic cradle system 100. The first support block 110 and the second support block 130 are positioned between the patient's hips, buttocks, and/or upper legs 520 and the underlying surface 510. The pelvic cradle system 100 biases the patient's legs 525 into a raised position while cradling their pelvis 515. The patient is free to bend their legs 525 at the knees 530 and can place their feet 535 on the underlying surface 510 as shown.

The shape of the first support block 110 and second support block 130 at angle 148 holds the pelvis 515 in a tucked position with space for the sacrum to float freely. The patient 505 can remain in this position as necessary, or while receiving additional treatment. The body position facilitated by the pelvic cradle system 100 can address spinal alignment issues including scoliosis, lordosis, and kyphosis. The sacrum is free in this body position, which can also help reduce or eliminate symptoms such as sciatica, hip pain, and tail bone pain.

In addition, the body position created by the pelvic cradle system lifts the pelvis 515 enough to traction the patient's 505 spine alleviating, and sometimes correcting, bulged disks, pinched nerves, and also stretching scar tissue in the dural tube of the spinal cord which is often the result of spinal trauma.

In various embodiments, the pelvic cradle system can be used as a tool in the application of cranial sacral therapy. The pelvic cradle system can thus be used to treat numerous pain related conditions, including but not limited to, chronic pain, fibromyalgia headaches, neck pain, fascial adhesions, scoliosis, lordosis, kyphosis, sciatica, hip pain, tail bone pain, bulged disks, pinched nerves, and other such ailments. In other embodiments, the pelvic cradle system can be used therapeutically to improve digestion and elimination. In particular, the system can be used to help patients have better bowel movements by improving structural alignment and allowing proper nerve function in the process of digestion.

Figure 6:
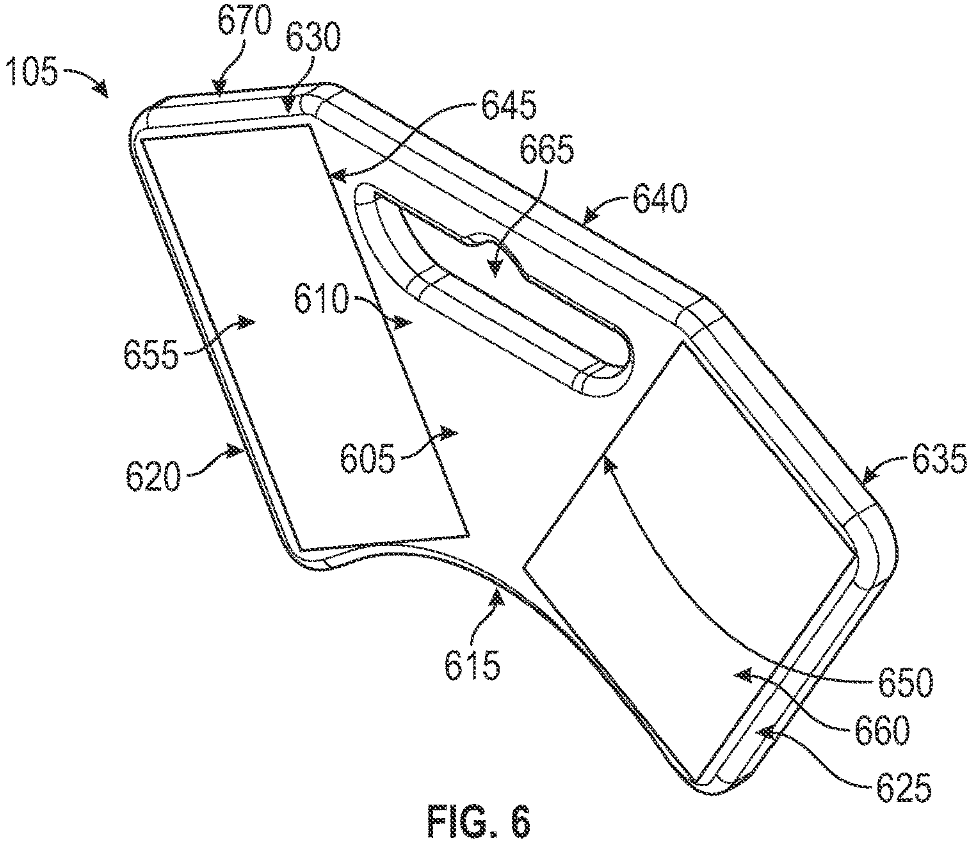
FIG. 6 illustrates aspects of a base plate associated with a pelvic cradle system, in accordance with aspects of the embodiments.

FIG. 6 provides a perspective view of the base plate 105, illustrating aspects of the disclosed embodiments. The base plate 105 can generally comprises a base structure 605, with a top surface 610 and a bottom surface (not shown). The perimeter 670 of the base plate 105 can include an arc 615 along the bottom edge, with a straight left side 620 and a straight right side 625.

The top perimeter of the base plate 105 can include a left angled section 630 and a right angled section 635, each of which meet along a flat top section 640. The left angled section 630 of the perimeter can roughly align with the location where the first support block 110 attaches to the base plate 105, and the right angled section 635 of the perimeter can roughly align the location where the second support block 130 attaches to the base plate 105.

A first connection pattern 645 can define the location where the first support block 110 attaches to the base plate. The first connection pattern 645 can have a textured surface 655 to make the base plate receptive to adhesive at that location. A second connection pattern 650 can define the location where the second support block 130 attaches to the base plate 105. The second connection pattern 650 can have a textured surface 660 to make the base plate 105 receptive to adhesive at that location.

The base plate 105 can further include a handle cutout 665 configured to allow a user to easily grip and reposition the system 100. The perimeter 670 of the base plate 105 can feature a rounded or chamfered profile, to reduce sharp edges along the base plate 105.

Figure 7A:
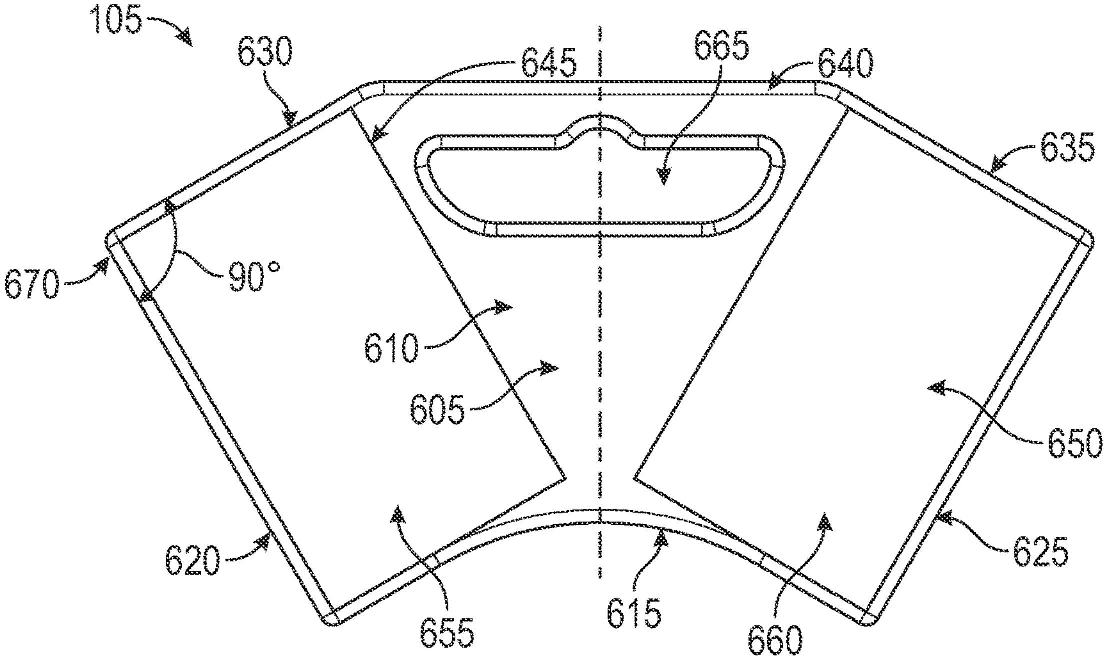
FIG. 7A illustrates aspects of a base plate associated with a pelvic cradle system, in accordance with aspects of the embodiments.

FIG. 7A illustrates additional aspects of the base plate 105. As shown in FIG. 7, the angle between the straight left side 620 and the right angled section 635 can be nominally a 90 degree angle. The angle between the straight left side 625 and the left angled section 630 can be a nominally 90 degree angle.

Figure 7B:
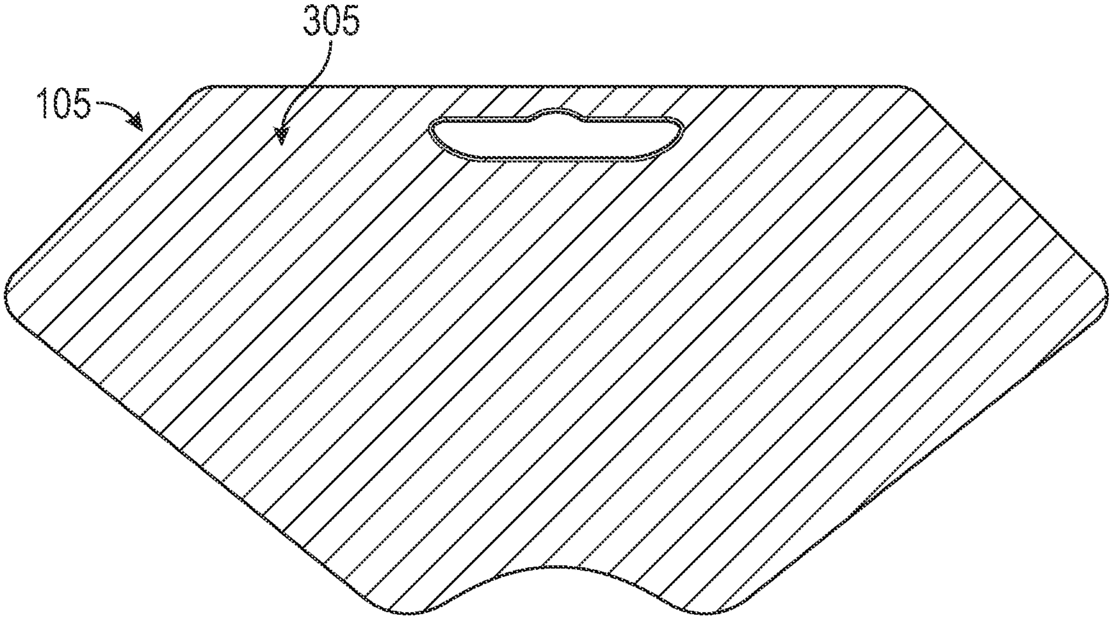
FIG. 7B illustrates additional aspects of a base plate associated with a pelvic cradle system, in accordance with aspects of the embodiments.

FIG. 7B illustrates additional aspects of the base plate 105. Specifically, in FIG. 7B the bottom surface 305 of the base plate is illustrated. In certain embodiments, the bottom surface 305 can be solid and/or smooth. This makes it easier to slide into position.

Figure 8:
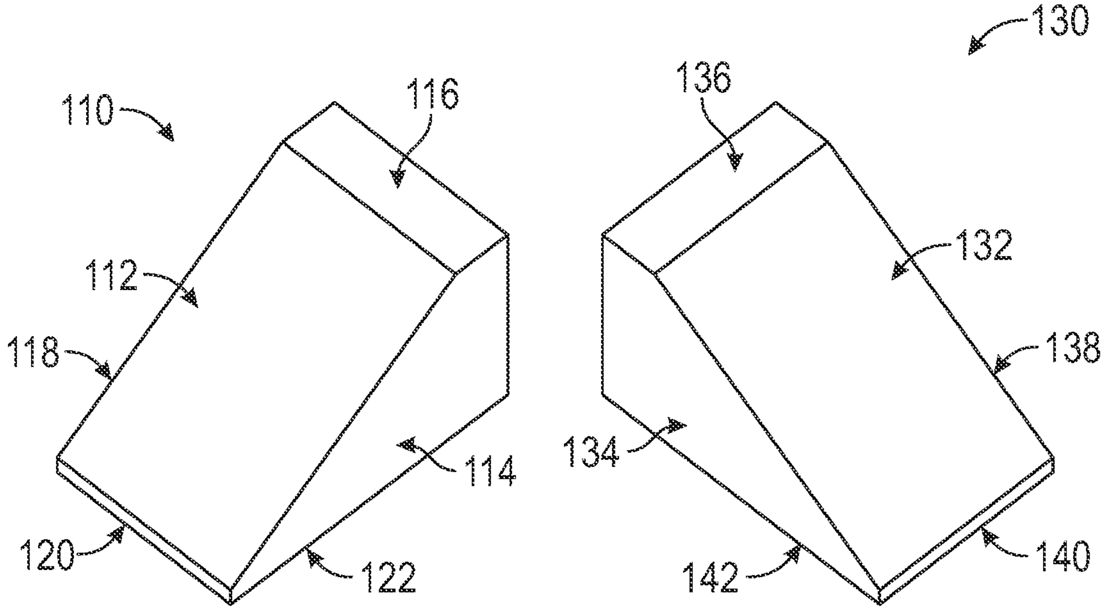
FIG. 8 illustrates aspects of support blocks associated with a pelvic cradle system, in accordance with aspects of the embodiments.

FIG. 8 illustrates aspects of the first support block 110 and second support block 130 in accordance with the disclosed embodiments. The first support block 110 comprises a wedge shape with a tapered top surface 112. The thick end 114 of the first support block 110, can include a flat landing surface 116 that meets the tapered top surface 112. The back wall 124 forms a nominally 90 degree angle with the flat landing surface 116. The first support block 110 can then terminate at the thin end 118 as a joint 120 between the top surface 112 and the bottom surface 122 of the first support block 110. The joint forms an acute angle 128 between the top surface 112 and the bottom surface 122. The first support block 110 can be comprised of foam, rubber, plastic, closed cell foam, or the like. However, in other embodiments, other materials can be used. Likewise, the density of the foam can be selected according to the desired application and to accommodate the patient. In exemplary embodiments, the first support block is configured to be structurally supportive but sufficiently cushioned so that it is not uncomfortable to lay against.

Similarly, the second support block 130 comprises a wedge shape with a tapered top surface 132. The thick end 134 of the second support block 130, can include a flat landing surface 136 that meets the tapered top surface 132. The back wall 144 forms a nominally 90 degree angle with the flat landing surface 136. The second support block 130 can then terminate at the thin end 138 as a joint 140 between the top surface 132 and the bottom surface 142 of the second support block 130. The joint 140 forms an acute angle between the top surface 132 and the bottom surface 142. The first support block 110 can be comprised of foam, rubber, plastic, closed cell foam, or the like. However, in other embodiments, other materials can be used. Likewise, the density of the foam can be selected according to the desired application and to accommodate the patient. In exemplary embodiments, the first support block is configured to be structurally supportive but sufficiently cushioned so that it is not uncomfortable to lay against.

Figure 9A:
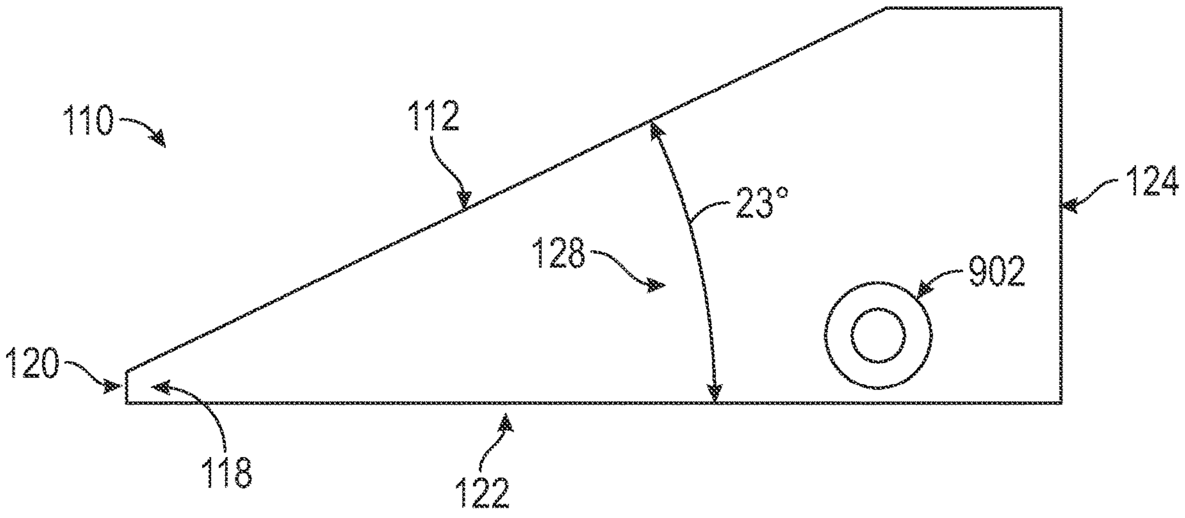
FIG. 9A illustrates a side elevation view of a first support block associated with a pelvic cradle system, in accordance with aspects of the embodiments.

FIG. 9A illustrates an elevation view of the first support block 110. The first support block 110 can then terminate at the thin end 118 as a joint 120 between the top surface 112 and the bottom surface 122 of the first support block 110. The joint forms an acute angle 128 between the top surface 112 and the bottom surface 122. In certain embodiments the angle 128 can be nominally 23 degrees, although other angles are possible. The first support block 110 can further be configured with a grip hole 902 configure to be used as a gripping surface on the first support block 110, so that the system 100 can be pulled into position.

Figure 9B:
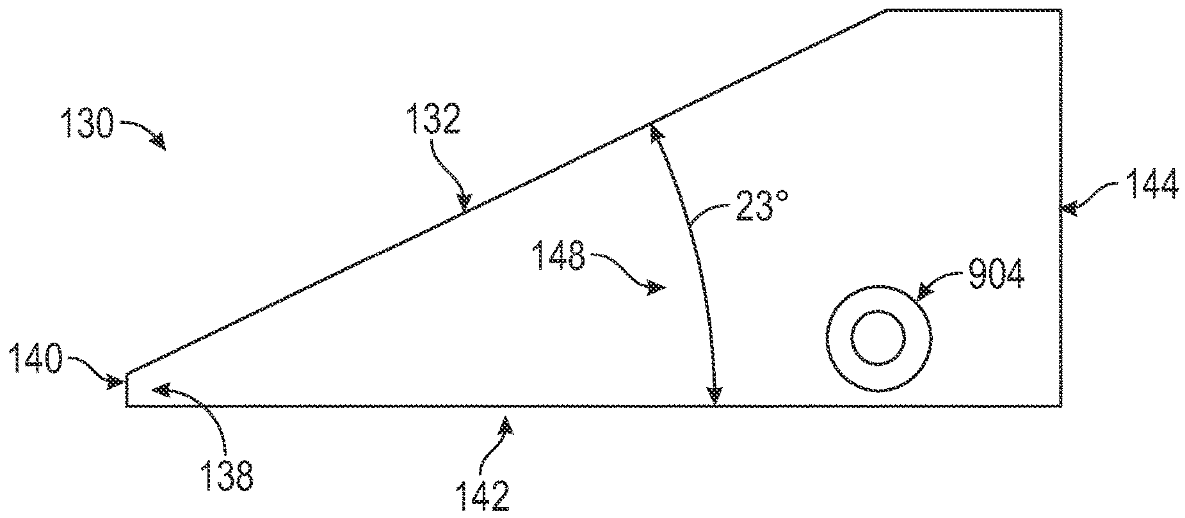
FIG. 9B illustrates a side elevation view of a second support block associated with a pelvic cradle system, in accordance with aspects of the embodiments.

FIG. 9B illustrates an elevation view of the second support block 130. The second support block 130 can then terminate at the thin end 138 as a joint 140 between the top surface 132 and the bottom surface 142 of the second support block 130. The joint 140 forms an acute angle between the top surface 132 and the bottom surface 142. In certain embodiments the angle 148 can be nominally 23 degrees, although other angles are possible. The second support block 130 can further be configured with a grip hole 904 configure to be used as a gripping surface on the second support block 130, so that the system 100 can be pulled into position.

Figure 9C:
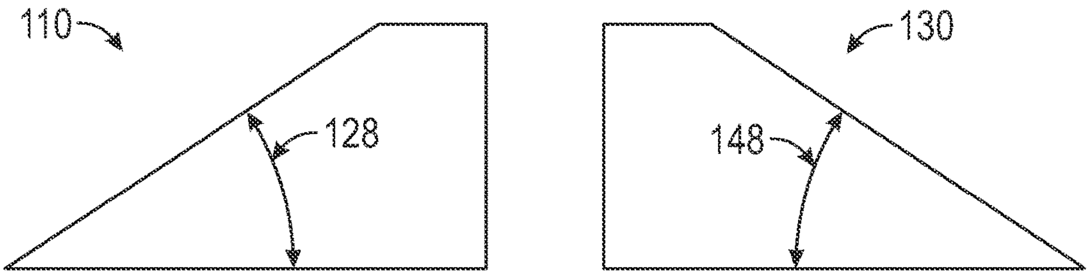
FIG. 9C illustrates aspects of a pair of support blocks associated with a pelvic cradle system, in accordance with the disclosed embodiments.
Figure 9D:
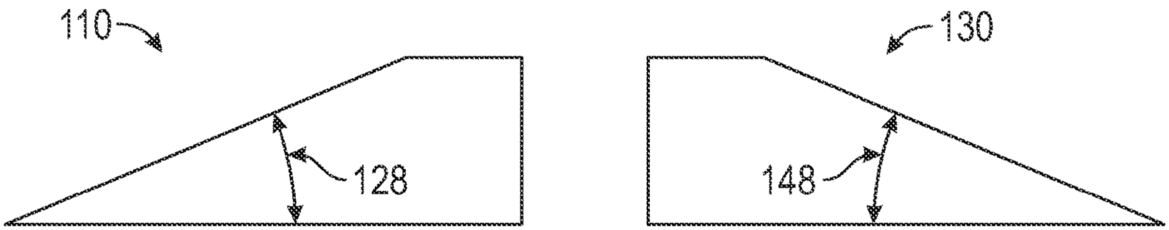
FIG. 9D illustrates aspects of a pair of support blocks associated with a pelvic cradle system, in accordance with the disclosed embodiments.

FIG. 9C illustrates an elevation view representative of the first support block 110 and the second support block 130, a steeper angle 128 and steeper angle 148 in accordance with certain embodiments. FIG. 9D illustrates an elevation view representative of the first support block 110 and the second support block 130, a shallower angle 128 and steeper angle 148 in accordance with certain embodiments.

Figure 9E:
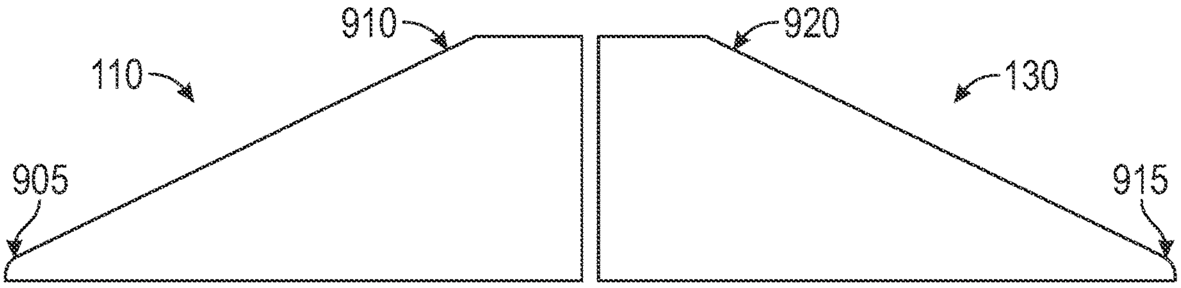
FIG. 9E illustrates aspects of a pair of support blocks with curved toes, associated with a pelvic cradle system, in accordance with the disclosed embodiments.

FIG. 9E illustrates an elevation view representative of the first support block 110 and the second support block 130, configured with a rounded edges to improve user comfort. For example, first support block 110 can comprise a rounded toe corner 905 and a rounded interface corner 910. Likewise, second support block 130 can comprise a rounded toe corner 915 and a rounded interface corner 920.

Figure 9F:
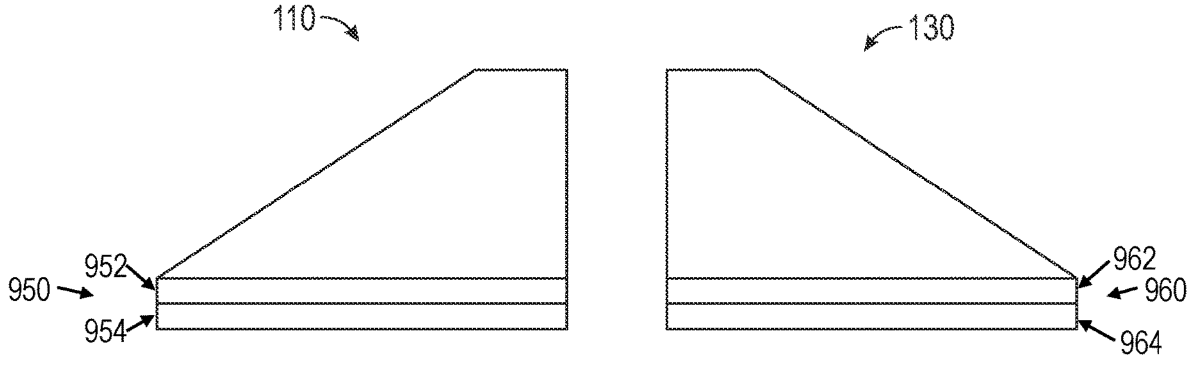
FIG. 9F illustrates aspects of a pair of support blocks associated with a pelvic cradle system, in accordance with the disclosed embodiments.

FIG. 9F illustrates another embodiment of the first support block 110 and second support block 130. In this embodiment the first support block 110 can be configured to include a plurality of riser blocks 950, including first riser block 952 and second riser pad 954. Two riser blocks are shown but more can be used as necessary. The riser blocks 950 can comprise rectangular pads formed of the same shape as the bottom of the first support block 110. The riser blocks 950 can be used to adjust the height of the first support block 110 based on the anatomy of the patient, by inserting the riser blocks 950 between the base 105 and first support block 110.

The embodiment further includes a plurality of riser blocks 960, including first riser block 962 and second riser pad 964. Two riser blocks are shown but more can be used as necessary. The riser blocks 960 can comprise rectangular pads formed of the same shape as the bottom of the second support block 130. The riser blocks 960 can be used to adjust the height of the second support block 130 based on the anatomy of the patient, by inserting the riser blocks 960 between the base 105 and second support block 130.

Figure 10:
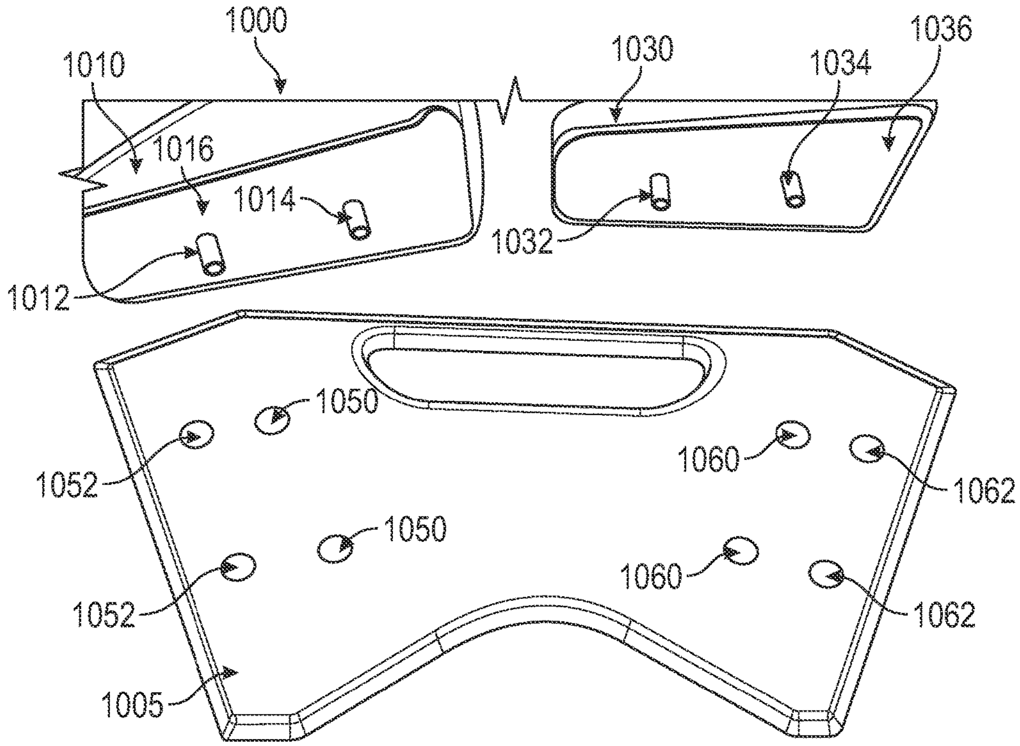
FIG. 10 illustrates another embodiment of a pelvic cradle system, in accordance with aspects of the embodiments.

FIG. 10 illustrates an alternative embodiment of an adjustable pelvic cradle system 1000, in accordance with the disclosed embodiments. The adjustable pelvic cradle system 1000 comprises a base plate 1005, a first support block 1010, and a second support block 1030. The first support block 1010 and second support block 1030 are configured to operably attach to the base plate.

The first support block 1010 comprises a wedge shape with a tapered top surface as illustrated in, for example FIGS. 1-4 and 8-9. In this embodiment, the first support block can be fitted with a first support post 1012 and a second support post 1014 in spaced relation to one another and positioned on the bottom surface 1016 of the first support block 1010.

Similarly, the second support block 1030 comprises a wedge shape with a tapered top surface as illustrated in, for example, FIGS. 1-4 and 8-9. In this embodiment, the second support block 1030 can be fitted with a first support post 1032 and a second support post 1034 in spaced relation to one another and positioned on the bottom surface 1036 of the second support block 1030.

The base plate 1005 can, generally speaking mirror the base plate 105 illustrated in FIGS. 1-4, 6, and 7. In this embodiment, the base plate further comprises a first set of first support block mounting holes 1050 and a second set of second support block mounting holes 1052. Each set of support block mounting holes in the base plate is configured with a distance therebetween matching the spaced relation of the first support post 1032 and the second support post 1034, such that the support posts can be inserted into the mounting holes. The second set of first support block mounting holes 1060 and the second set of second support block mounting holes 1062, can be separated by a distance and configured at dissimilar angles so that the position of the first support block 1010 mounted on the base plate can be adjusted according to the patient using the system 1000.

The base plate 1005 can further comprise a first set of second support block mounting holes 1060 and a second set of second support block mounting holes 1062. Each set of support block mounting holes in the base plate is configured with a distance therebetween matching the spaced relation of the second first post 1032 and the second support post 1034, such that the support posts can be inserted into the mounting holes. The first set of second support block mounting holes 1060 and the second set of second support block mounting holes 1062, can be separated by a distance and configured at dissimilar angles so that the position of the first support block 1010 mounted on the base plate can be adjusted according to the patient using the system 1000.

It should be appreciated that the embodiment illustrated in FIG. 10 provides an adjustable width between the support blocks, as well as the angle between the support blocks. In certain embodiments, the widths of the support blocks themselves can come in varying sizes (width, height, and angle of wedge) and can be select to provide the best therapeutic and comfortable fit for the patient. In other embodiments, the size of the support block as well as the space between them and the angle between them can be pre-set to a “one size fits all” arrangement as illustrated in, for example, FIGS. 1-4.

Figure 11A:
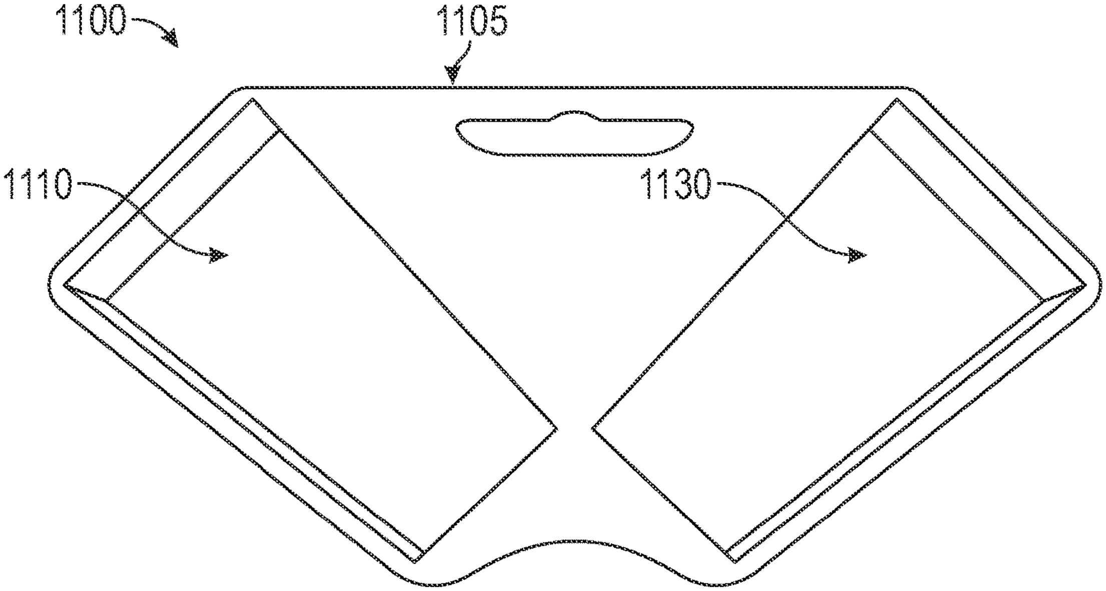
FIG. 11A illustrates aspects of another embodiment of a pelvic cradle system, in accordance with the disclosed embodiments.

FIG. 11A illustrates a bottom view pelvic cradle system 1100 in accordance with the disclosed embodiments. The molded pelvic cradle system 1100 comprises a molded piece with a base plate 1105, a first support block mold 1110, and a second support block mold 1130. The first support block mold 1110 and second support block mold 1130 are configured as molded forms in the base plate 1105 creating a first support block and second support block.

Figure 11B:
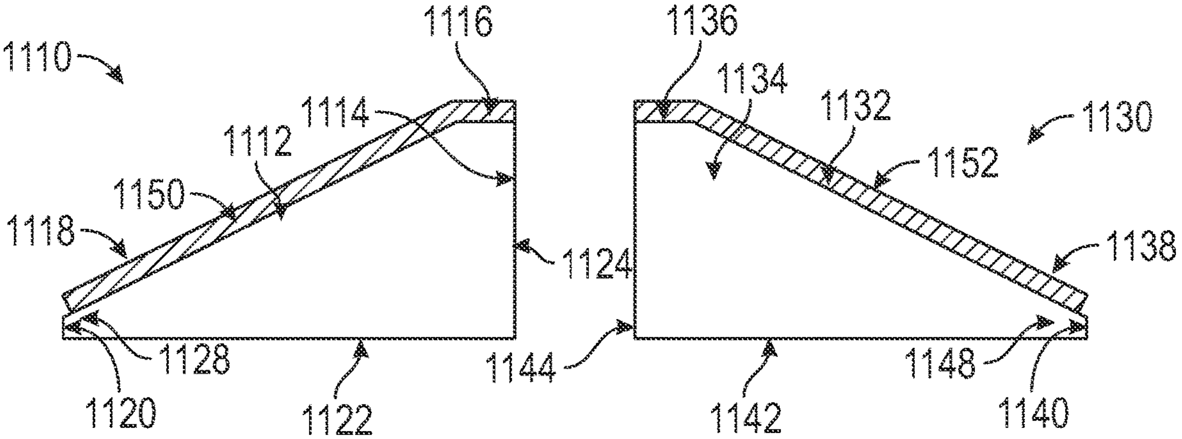
FIG. 11B illustrates additional aspects associated with a pair of support block, in accordance with the disclosed embodiments.

As illustrated in FIG. 11B, the first support block mold 1110 comprises a wedge shape with a tapered top surface 1112. The thick end 1114 of the first support block mold 1110, can include a flat landing surface 1116 that meets the tapered top surface 1112. The back wall 1124 forms a nominally 90 degree angle with the flat landing surface 1116. The first support block mold 1110 can then terminate at the thin end 1118 as a joint 1120 between the top surface 1112 and the bottom surface 1122 of the first support block mold 1110. The joint forms an acute angle 1128 between the top surface 1112 and the bottom surface 1122. In certain embodiments the angle 1128 can be nominally 23 degrees, although other angles are possible.

Similarly, the second support block mold 1130 comprises a wedge shape with a tapered top surface 1132. The thick end 1134 of the second support block mold 1130, can include a flat landing surface 1136 that meets the tapered top surface 1132. The back wall 1144 forms a nominally 90 degree angle with the flat landing surface 1136. The second support block mold 1130 can then terminate at the thin end 1138 as a joint 1140 between the top surface 1132 and the bottom surface 1142 of the second support block mold 1130. The joint 1140 forms an acute angle between the top surface 1132 and the bottom surface 1142. In certain embodiments the angle 1148 can be nominally 23 degrees, although other angles are possible.

FIG. 11B illustrates aspect of the first support block mold 1110 and second support block mold 1130, in accordance with the disclosed embodiments. As illustrated, the first support block mold can be fitted along the tapered top surface 1112 and flat landing surface 1116, with a pad 1150. The pad 1150 can comprise foam, cloth, soft rubber, or other such padded textile. The pad 1150 can be mounted to the first support block mold 1110 with adhesive, hook and loop fastener, or other such connection means.

The second support block mold 1130 can be fitted along the tapered top surface 1132 and flat landing surface 1136, with a pad 1152. The pad 1152 can comprise foam, cloth, soft rubber, or other such padded textile. The pad 1152 can be mounted to the second support block mold 1130 with adhesive, hook and loop fastener, or other such connection means.

Based on the foregoing, it can be appreciated that a number of embodiments, preferred and alternative, are disclosed herein. In an embodiment, a pelvic cradle system comprises a base plate, a first wedge shaped support block mounted to the base plate, and a second wedge shaped support block mounted to the base plate.

In an embodiment, the first wedge shaped support block and the second wedge shaped support block are arranged at a nominal angle of 60 degrees between one another. In an embodiment, the first wedge shaped support block further comprises a tapered top surface intersecting with a flat landing surface. In an embodiment, the pelvic cradle system further comprises a joint between the tapered top surface and a bottom surface forming the joint. In an embodiment, the joint comprises a nominally 23 degree angle between the tapered top surface and the bottom surface.

In an embodiment, the second wedge shaped support block further comprises a tapered top surface intersecting with a flat landing surface. In an embodiment, the second wedge shaped support block further comprises a joint between the tapered top surface and a bottom surface forming the joint. In an embodiment, the joint comprises a nominally 23 degree angle between the tapered top surface and the bottom surface.

In an embodiment, the pelvic cradle system further comprises a first connection pattern formed on the base plate with a textured surface and a second connection pattern formed on the base plate with a textured surface. In an embodiment, the pelvic cradle system further comprises an adhesive connecting the first wedge shaped support block to the base plate and an adhesive connecting the second wedge shaped support block to the base plate.

In an embodiment, the base plate further comprises a perimeter further comprising a bottom arc, a straight left side adjoining the bottom arc, a straight right side adjoining the bottom arc, a left angled section adjoining the straight left side, a right angled section adjoining the straight right side, and a flat top section adjoining the left angled section and the right angled section.

In an embodiment, the pelvic cradle system further comprises a handle formed in the base plate.

In another embodiment, a therapeutic device comprises a base plate, a first support block with a thick end and a thin end mounted to the base plate, and a second support block with a thick end and a thin end mounted to the base plate, wherein the first support block and the second support block are arranged such that the thin end of the first support block and the thin end of the second support block are configured at an acute angle between one another on the base plate.

In an embodiment, the first support block and the second support block are configured to cradle a pelvis of a patient.

In an embodiment, the first support block further comprises a tapered top surface intersecting with a flat landing surface and a joint between the tapered top surface and a bottom surface forming the joint. In an embodiment, the second support block further comprises a tapered top surface intersecting with a flat landing surface and a joint between the tapered top surface and a bottom surface forming the joint.

In an embodiment the therapeutic device further comprises a first connection pattern formed on the base plate with a textured surface wherein the first support block is mounted to the base plate at the first connection pattern and a second connection pattern formed on the base plate with a textured surface wherein the second support block is mounted to the base plate at the second connection pattern. In an embodiment the therapeutic device further comprises an adhesive connecting the first support block to the base plate and an adhesive connecting the second support block to the base plate.

In another embodiment, a pelvic cradle system comprises a base plate, a first wedge shaped support block with a thick end and a thin end mounted to the base plate, and a second wedge shaped support block with a thick end and a thin end mounted to the base plate, wherein the first wedge shaped support block and the second wedge shaped support block are arranged such that the thin end of the first wedge shaped support block and the thin end of the second wedge shaped support block are configured at an acute angle between one another on the base plate. In an embodiment, the acute angle between the first wedge shaped support block and the second wedge shaped support is 60 degrees.

It should be appreciated that variations of the above-disclosed and other features and functions, or alternatives thereof, may be desirably combined into many other different systems or applications. It should be understood that various presently unforeseen or unanticipated alternatives, modifications, variations, or improvements therein may be subsequently made by those skilled in the art which are also intended to be encompassed by the following claims.

What is claimed is:

1. A pelvic cradle system comprising:

a base plate;

a first wedge shaped support block mounted to the base plate on a bottom surface of the first wedge shaped support block; and a second wedge shaped support block mounted to the base plate on a bottom surface of the second wedge shaped support block, wherein the bottom surface of the first wedge shaped support block and the bottom surface of the second wedge shaped support block are configured on the base plate such that an angle is formed between an axis of a longitudinal side of the bottom surface of the first wedge shaped support block and an axis of a longitudinal side of the bottom surface of the second wedge shaped support block, wherein the angle formed between the axis of a longitudinal side of the bottom surface of the first wedge shaped support block and the axis of the longitudinal side of the bottom surface of the second wedge shaped support block is nominally 60 degrees.

2. The pelvic cradle system of claim 1 wherein the first wedge shaped support block further comprises:

a tapered top surface intersecting with a flat landing surface.

3. The pelvic cradle system of claim 2 further comprises:

a joint between the tapered top surface and a bottom surface forming the joint.

4. The pelvic cradle system of claim 3 wherein the joint comprises a nominally 23 degree angle between the tapered top surface and the bottom surface.

5. The pelvic cradle system of claim 1 wherein the second wedge shaped support block further comprises:

a tapered top surface intersecting with a flat landing surface.

6. The pelvic cradle system of claim 5 wherein the second wedge shaped support block further comprises:

a joint between the tapered top surface and a bottom surface forming the joint.

7. The pelvic cradle system of claim 6 wherein the joint comprises a nominally 23 degree angle between the tapered top surface and the bottom surface.

8. The pelvic cradle system of claim 1 further comprising:

a first connection pattern formed on the base plate with a textured surface; and a second connection pattern formed on the base plate with a textured surface.

9. The pelvic cradle system of claim 1 further comprising:

an adhesive connecting the first wedge shaped support block to the base plate; and an adhesive connecting the second wedge shaped support block to the base plate.

10. The pelvic cradle system of claim 1 wherein the base plate further comprises:

a perimeter further comprising:

a bottom arc;

a straight left side adjoining the bottom arc;

a straight right side adjoining the bottom arc;

a left angled section adjoining the straight left side;

a right angled section adjoining the straight right side; and a flat top section adjoining the left angled section and the right angled section.

11. The pelvic cradle system of claim 1 further comprising:

a handle formed in the base plate.

12. A pelvic cradle system comprising:

a base plate;

a first wedge shaped support block with a thick end and a thin end mounted to the base plate; and a second wedge shaped support block with a thick end and a thin end mounted to the base plate, wherein the first wedge shaped support block and the second wedge shaped support block are arranged such that the thin end of the first wedge shaped support block and the thin end of the second wedge shaped support block are configured at an acute angle between one another on the base plate wherein the acute angle is formed between an axis of a longitudinal side of a bottom surface of the first wedge shaped support block and an axis of a longitudinal side of a bottom surface of the second wedge shaped support block, wherein the acute angle between the first wedge shaped support block and the second wedge shaped support is 60 degrees.

* * * * *